United States Patent
Edwards et al.

(10) Patent No.: US 8,749,241 B2
(45) Date of Patent: Jun. 10, 2014

(54) METHODS AND APPARATUS FOR GEOPHYSICAL PROSPECTING TO DETECT BODIES OF FLUIDS IN UNDERGROUND FORMATIONS

(75) Inventors: Christopher Edwards, Oklahoma City, OK (US); Michael Nosworthy, Suzette (FR)

(73) Assignee: EMON (UK) Limited, London (GB)

( * ) Notice: Subject to any disclaimer, the term of this patent is extended or adjusted under 35 U.S.C. 154(b) by 0 days.

(21) Appl. No.: 13/879,665

(22) PCT Filed: Oct. 20, 2011

(86) PCT No.: PCT/GB2011/052038
§ 371 (c)(1),
(2), (4) Date: Oct. 10, 2013

(87) PCT Pub. No.: WO2012/052770
PCT Pub. Date: Apr. 26, 2012

(65) Prior Publication Data
US 2014/0022862 A1    Jan. 23, 2014

(30) Foreign Application Priority Data
Oct. 20, 2010  (GB) .................................. 1017701.2

(51) Int. Cl.
*G01V 3/00*  (2006.01)
*G01V 3/08*  (2006.01)
*G01V 3/12*  (2006.01)

(52) U.S. Cl.
USPC .......................................... 324/337; 324/334

(58) Field of Classification Search
USPC .................................................. 324/334, 337
See application file for complete search history.

(56) References Cited

U.S. PATENT DOCUMENTS

| 4,639,675 A | 1/1987 | Hinton |
| 4,904,942 A | 2/1990 | Thompson |

(Continued)

FOREIGN PATENT DOCUMENTS

| EP | 1577683 | 9/2005 |
| WO | WO 2009/058692 A2 | 5/2009 |

OTHER PUBLICATIONS

Gharibi, M., et al., "The coupled seismoelectric wave propogation in porous media: Theoretical background," Crewes Research Report, vol. 16, Jan. 1, 2006, pp. 1-12. http://www.crewes.org/ForOurSponsors/ResearchReports/2004/2004-25.pdf.

(Continued)

*Primary Examiner* — Bot Ledynh
(74) *Attorney, Agent, or Firm* — DASCENZO Intellectual Property Law, P.C.

(57) ABSTRACT

A method of geophysical prospecting for detecting bodies of fluids in underground formations comprises the steps of activating a seismic energy source (2) to transmit seismic energy into the ground, detecting an electromagnetic signal (14) generated by interaction between the seismic energy and underground formations (12) including fluids, and recording properties of the detected electromagnetic signal against time, so as to record an electromagnetic signal generated by interaction between a secondary energy impulse (10) from the activation of the energy source and underground formations including fluids. The secondary energy impulse propagates to the formations more slowly than the primary seismic waves from the same activation of the energy source travelling at the speed of sound as attenuated by the materials through which they pass. The detected electromagnetic signal comprises frequencies in the range 0 to 30 Hz. Recorded signals may then be processed to correlate them with the depth and thickness of fluid-containing underground formations with which the secondary energy impulse interacts to generate the electromagnetic waves.

33 Claims, 7 Drawing Sheets

(56) References Cited

U.S. PATENT DOCUMENTS

| | | | |
|---|---|---|---|
| 5,486,764 | A | 1/1996 | Thompson et al. |
| H1524 | H | 4/1996 | Thompson et al. |
| 5,841,280 | A | 11/1998 | Yu et al. |
| 5,903,153 | A | 5/1999 | Clarke et al. |
| 6,477,113 | B2 | 11/2002 | Hornbostel et al. |
| 6,805,781 | B2 | 10/2004 | Sørensen et al. |
| 6,900,639 | B2 | 5/2005 | Ellingsrud et al. |
| 7,042,801 | B1 | 5/2006 | Berg |

OTHER PUBLICATIONS

Pride, S., et al., "The role of Biot slow waves in electroseismic wave phenomena," The Journal of the Acoustical Society of America, American Institute of Physics for the Acoustical Society of America, New York, New York, U.S., vol. 111, No. 2, Feb. 1, 2002, pp. 697-706. (Abstract only) http://www.ncbi.nlm.nih.gov/pubmed/11863172.

Prance, R. J., et al., "Ultra low noise induction magnetometer for variable temperature operation," Sensors and Actuators 85, Elsevier Science S.A., pp. 361-364, 2000. http://www.ltpaobserverproject.com/uploads/3/0/2/0/3020041/ultra_low_noise_induction_magnetometer_for_variable_temperature.pdf.

Prance, R. J., et al., "Vector measurements with combined magnetic and electric field sensors," AIP Review of Scientific Instruments 74, 1319, American Institute of Physics, 2003. (Abstract only) http://scitation.aip.org/content/aip/journal/rsi/74/3/10.1063/1.1540716.

Prance, R. J., et al., "Compact room-temperature induction magnetometer with superconducting quantum interference device level field sensitivity," AIP Review of Scientific Instruments 74, 3735, American Institute of Physics, 2003. (Abstract only) http://scitation.aip.org/content/aip/journal/rsi/74/8/10.1063/1.1590745.

Jupp, Tim E., et al., "A poroelastic model for the tidal modulation of seafloor hydrothermal systems," Journal of Geophysical Research: Solid Earth (1978-2012), vol. 109, Issue B3, Mar. 2004. (Abstract only) http://onlinelibrary.wiley.com/doi/10.1029/2003JB002583/abstract.

Sakuta, K., et al., "System noise cancellation by digital signal processing for SQUID measurement," Superconductor Science and Technology, vol. 19, No. 5, Mar. 23, 2006. (Abstract only) http://iopscience.iop.org/0953-2048/19/5/S 51/pdf/0953-2048_19_5_S51.pdf.

Lui, Y., et al., "Wave Propogation in Transversely Isotropic Fluid-Saturated Poroelastic Media," The Japan Society of Mechanical Engineers, JSME International Journal, Series A, vol. 45, No. 3, 2002. http://ci.nii.ac.jp/els/10016190363.pdf?id=ART0003857039&type=pdf&lang=en &host=cinii&order_no=&ppv_type=0&lang_sw=&no=1381833908&cp=.

Schoenberg, et al., "Poroelastic modeling of seismic boundary conditions across a fracture," Earth Sciences Division, Lawrence Berkeley National Laboratory, Berkeley California, 2007. https://www.google.co.uk/url?sa=t&rct=j&q=&esrc=s&source=web&cd=1&ved=0CDMQFjAA&url=https%3A%2F%2Fpublications.lbl.gov%2Fislandora%2F object%2Fir%253A127471%2Fdatastream%2FPDF%2Fdownload&ei=5hxdUs -KKueHOAX7qIH4Ag&usg=AFQjCNFoS9TDRjz35H6g-tNAJmXW1scsRA&sig2=Pts1RVzzAw9cUNL8OQ7BdQ&bvm=bv.53899372,d.d2k.

Chiavassa, G., et al., "Numerical modeling of 1-D transient poroelastic waves," Ecole Centrale de Marseille and MSNM-GP, Marseille, France, Laboratoire de Mécanique et d'Acoustique, Marseille, France, 2007. http://www.lma.cnrs-mrs.fr/~MI/Congres/Waves07A.pdf.

Thompson, A. H., et al., "Geophysical applications of electrokinetic conversion," The Leading Edge, 12(12), 1169-1173, 1993. (Abstract only) http://library.seg.org/doi/abs/10.1190/1.1436931.

METHODS AND APPARATUS FOR GEOPHYSICAL PROSPECTING TO DETECT BODIES OF FLUIDS IN UNDERGROUND FORMATIONS

FIELD OF THE INVENTION

The present invention relates to the acquisition of geophysical data with a view to detecting bodies of oil, gas and other fluids below ground. More particularly, it relates to techniques involving electrokinetic seismic phenomena in order to obtain information concerning the location and constitution of underground reservoirs.

BACKGROUND TO THE INVENTION

Conventional reflection seismology involves generating acoustic waves from a seismic energy source and then detecting reflections of those waves from interfaces in the earth is formation being analysed. When a velocity interface is encountered, the seismic waves are partially reflected back to the surface, where they are detected and recorded. The time taken for the reflected energy to return travelling at the speed of sound through the earth (as attenuated by the different types of rocks and formations encountered) indicates the depth of the reflecting structure. Geophones are used to measure the vertical and/or horizontal components of the reflected seismic waves.

U.S. Pat. No. 4,904,942 discloses a different scheme for seismic analysis referred to as "electroseismic" prospecting. In this approach, seismic energy is converted into electromagnetic energy. This conversion is believed to take place as a result of distortion or breakage of bonds between a fluid and the surface of a porous structure containing the fluid. Rapid movement of the fluid caused by an incident acoustical wave front disturbs these dipoles and induces an electromagnetic response. In contrast to a reflected acoustic wave, the electromagnetic wave generated by the electromagnetic response travels at the speed of light through the earth (as attenuated by the materials encountered) with respect to the rock formations.

EP 1577683 describes a method for characterising a formation including exciting the formation with an acoustic wave and measuring a seismo-electromagnetic response, and then exciting the formation with an electromagnetic field and measuring an electromagnetic-seismic response.

SUMMARY OF THE INVENTION

The present invention provides a method of geophysical prospecting for detecting bodies of fluids in underground porous formations, comprising the steps of:

activating a seismic energy source to transmit seismic energy into the ground;

detecting an electromagnetic signal generated by interaction between the seismic energy and underground formations containing fluids; and recording at least one parameter derived from the detected electromagnetic signal against time, the signal being generated by interaction between a secondary energy impulse from the activation of the energy source and underground formations including fluids, the secondary energy impulse propagating to the formations more slowly than the primary seismic waves from the same activation of the energy source travelling at the speed of sound through the earth (as attenuated by the materials encountered), wherein the detected electromagnetic signal comprises frequencies in the range 0 to 30 Hz.

The present inventors have identified a secondary electromagnetic signal comprising frequencies in the range 0 to 30 Hz generated in response to activation of a seismic energy source. These signal returns appeared at very late times (extending to many tens of seconds to minutes after the activation times), far outside the times expected for seismic returns or electroseismic phenomena as previously known in this field. It is believed that a secondary slow energy wave travels into the ground, penetrating to significant depths and providing enough energy to move fluids encountered in porous media as it travels down, triggering an electroseismic response. The relatively slow speed of the slow secondary wave (substantially slower than the primary seismic waves) means that the response signal is generated over a longer time period, making it easier to record with greater resolution with respect to times and therefore with respect to the depth below the surface of the detected formations.

The method preferably includes signal processing involving converting the detected electromagnetic signal via a current-to-voltage converter. It may further include amplifying lower frequencies of the signal output from the current-to-voltage conversion step relative to higher frequencies of the signal output.

In preferred implementations, the detecting step detects the rate of change of the electromagnetic signal, and the method includes a step of integrating the detected signal with respect to time. For example, where the detector used senses the time derivative of the magnetic field strength, integrating the signal with respect to time will yield the magnetic field strength with respect to time.

The recording step may comprise recording harmonics of the original electromagnetic signal generated by interaction between the seismic energy and underground formations including fluids are recorded. Thus, the "detected" electromagnetic signal may be detected or identified with reference to harmonics it generates in the apparatus. Harmonics may come from various sources in the apparatus. For example, they may arise in an antenna, a sound card, in a data acquisition system, and FFT analysis may see very high frequencies as the result of chopping up the signal in the digital conversion process. Techniques associated with harmonics arising in sound cards are described in "Observations on Sound Card Audio Levels and MFSK16 Spurious Emissions" by Jack R. Smith, the contents of which are incorporated herein by reference.

In further embodiments, a magnetic component of the electromagnetic response waves is detected, preferably in two or three mutually orthogonal directions. Furthermore, an electric component of the response may also be detected. Preferably two horizontal orthogonal directions are detected or three mutually orthogonal components are detected. These measurements may be carried out at two or more locations.

It is believed that the secondary energy impulse is at least partially propagated as a poroelastic compressional slow wave. In recent years, research has been carried out into wave propagation in anisotropic poroelastic media. For example, the paper "Wave propagation in transversely isotropic fluid-saturated poroelastic media" by Liu et al, Series A, Vol. 45, No. 3 2002, JSME International Journal, considers the propagation characteristics of such waves and identifies several background papers. They build on the work of Biot, who formulated constitutive equations and equations of motion for anisotropic fluid-saturated porous media. His theory suggests that three types of elastic waves exist in poroelastic media, namely a shear or transverse wave, and two types of longitudinal or compressional waves, which Biot called type I and II waves. The transverse and type I or (fast) longitudinal waves are similar to the transverse and longitudinal waves in an elastic solid respectively. The slow compressional wave, also known as Biot's slow wave, is associated with poroelastic materials. It is believed by the inventors that this poroelastic slow wave may play a role in the phenomena upon which the present invention is based.

Thus, it is believed that the seismic energy source sets up a diffusive poroelastic pressure loading. This leads to volumetric dilatation and shear strains on hydrocarbon and other fluid bearing pores within the underground formations. An electromotive force is generated by the motion of the charge-bearing fluids in the formation pores. The change in confining pressure also leads to a change in material resistivity, which also influences the magnitude of the resulting electromagnetic fields. The electromotive force results in a secondary magnetic field which diffuses back up to the surface which is detected by the receiving apparatus.

Recorded signals may then be processed to correlate them with the depth of fluid-containing underground formations with which the secondary energy impulse interacts to generate the electromagnetic waves.

The inventors have determined that the data is preferably correlated with depth on the basis that the secondary energy impulse propagates from the energy source to the electromagnetic wave generating formations at an average speed in the range 5-30 m/s (or more preferably 10-20 m/s).

The seismic energy source is preferably located above ground, that is, the source is preferably surface-based.

In preferred techniques, the seismic energy source is activated at least twice, with a predetermined time interval between the activations, and the electromagnetic wave responses detected after each activation are then compared. Information may then be determined relating to the properties of a fluid detected underground on the basis of the comparison. It has been found that repeated activations cause changes in signal strength as underground fluids are disturbed, but different fluids with different viscosities and identities may be affected in different ways.

Statistical analysis may be used to process measurements derived from a plurality of seismic energy source activations carried out at the same location.

In a further variation, the method includes activating the seismic energy source at at least two different locations, wherein the detecting and recording steps are carried out after each activation.

The electromagnetic waves may be detected using at least two antennas with the signals generated by the antennas being compared so as to identify signal content attributable to noise which may then be subtracted from the signals.

Furthermore, the method may include steps of detecting ambient noise present at a detection location and processing signals generated during detection of electromagnetic waves generated in the ground to reduce the amount of signal content attributable to the ambient noise.

In preferred embodiments, the recorded data is analysed or adjusted having regard to the effects of gravity attributable to the moon and/or the sun. The effect of the moon and/or sun pulling on fluids in the ground may influence the return signal strength. By building up a database of information concerning the relationship between such gravitational effects and signal strength, algorithms may be developed to adjust signal strength to take into account these influences. The recorded data may also be adjusted having regard to solar radiation levels. By determining effects attributable to solar radiation, data can be adjusted having regard to radiation levels measured at the time of signal detection.

In accordance with embodiments of the present method, information may be determined relating to the properties of a body of fluid detected underground, with reference to the frequency and/or amplitude of detected electromagnetic waves generated by interaction between the secondary energy impulse and underground formations of which the body of fluid forms part. It has been determined that quantative assessment of changes in the frequency content of the detected signal as a function of travel time, can provide information regarding fluid-containing formations. Furthermore, peaks in plots of the amplitude of the signal against frequency may be associated with specific pore fluid compositions.

The effect described herein appears to stimulate movement of the underground fluids and provides signals when the reservoirs have porosity or permeability. The acoustic wave entering the formation from above is believed to stimulate a movement within the reservoir, the movement being much greater when the reservoir is porous or permeable. Thus, the detected electromagnetic signal may be correlated with the porosity or permeability of the underground formation.

As well as use in mapping conventional gas and oil reservoirs, the present techniques are also applicable to mapping other fluid-containing formations, including those having relatively low porosity or permeability (such as shales). Recently, extraction technology has been developed which makes it economically viable to extract fluids from these formations. The response achieved using the methods herein appears to be better when the fluids can move, which normally occurs in regions where there are fractures or localised regions of porosity or permeability.

According to a further aspect, the present invention provides apparatus for geophysical prospecting to detect bodies of fluids in underground formations, comprising:

a detector assembly for detecting an electromagnetic signal generated by interaction between seismic energy from a user-activated seismic energy source and underground formations; and a recorder arranged to record at least one parameter derived from the detected electromagnetic signal against time, the signal being generated by interaction between a secondary energy impulse from the activation of the energy source and underground formations, the secondary energy impulse propagating to the formations more slowly than the primary seismic waves from the same activation of the energy source travelling at around the speed of sound (as attenuated by the materials through which they pass), wherein the detected signal comprises frequencies in the range 0 to 30 Hz.

One or more coil antennas with a core made of a high magnetic permeability material are preferably used to measure the magnetic portion of the electromagnetic signals. The antenna(s) may stimulate harmonics of the original electromagnetic signal.

The recorder may be arranged to record harmonics of the electromagnetic signal generated by interaction between the seismic energy and underground formations including fluids. As noted above, harmonics may come from various sources in the apparatus, and may be analysed to provide information relating to the underlying, original electromagnetic signal.

In some embodiments, the detector assembly comprises an antenna, and magnetic shielding associated with the antenna to reduce the magnitude of signals incident on the antenna which emanate from a source above the ground.

Preferably, the detector assembly comprises at least two antennas, and the apparatus includes a processor for comparing the signals generated by the antennas so as to identify signal content attributable to noise.

The detector assembly may include at least one geophone to detect the seismic response to the energy source.

To process the detected signals, the apparatus preferably includes a current-to-voltage converter electrically coupled to the detector assembly. Furthermore, it may have an amplifier electrically coupled to the current-to-voltage converter and arranged to amplify lower frequencies of the output from the current-to-voltage converter relative to higher frequencies of the output. An integrator may be incorporated for integrating the detected signal.

BRIEF DESCRIPTION OF THE DRAWINGS

Embodiments of the invention will now be described by way of example and with reference to the accompanying schematic drawings, wherein.

DETAILED DESCRIPTION OF THE DRAWINGS

Figure 1:
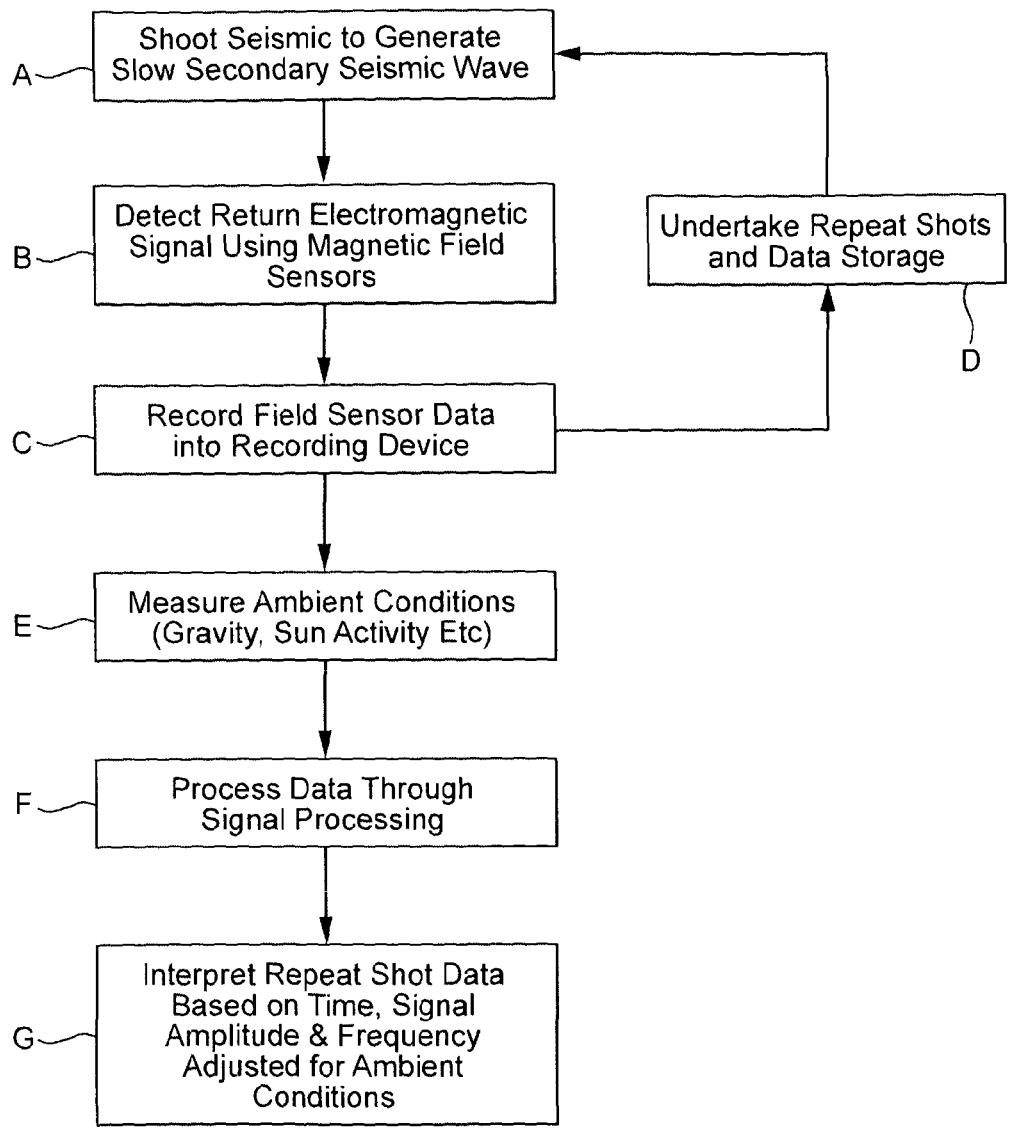
FIG. 1 is a flow diagram illustrating a method of geophysical prospecting according to an embodiment of the invention.
Figure 2:
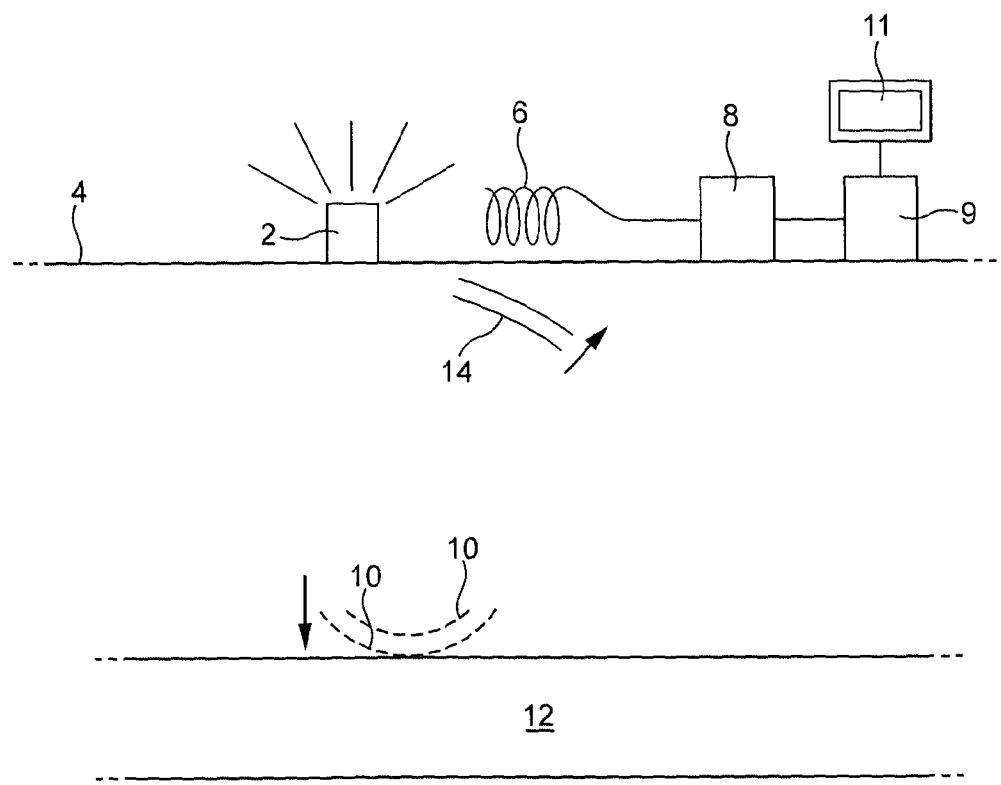
FIG. 2 is a schematic representation of apparatus for geophysical prospecting according to an embodiment of the invention.

FIG. 2 illustrates schematically apparatus for carrying out the process shown in the flow diagram of FIG. 1. A seismic energy source 2 is located on or close to the Earth's surface 4. Alternatively, it may be deployed below the Earth's surface, for example part-way down a well or at the bottom of a well or a water-filled bore hole. A detector assembly 6 is communicatively coupled to a recorder 8.

In a method of geophysical prospecting embodying the present invention, the seismic energy source 2 is activated to transmit seismic energy into the ground (step A in FIG. 1). It is well known that this generates energy waves into the ground travelling at the speed of sound as attenuated by the materials through which it passes. However, the present technique also recognises the generation of a secondary energy impulse following activation of the source. It has been determined that this secondary wave travels at an average speed to underground formations including fluids of around 5-30 m/s. FIG. 2 shows wavefronts 10 of this energy impinging on an oil and gas reservoir 12.

Interaction between the secondary energy impulse and the underground formations including fluids results in generation of an electromagnetic signal, part of which (14) is returned to the surface at the speed of light (as attenuated by the materials through which it passes).

The returned electromagnetic signal generates a response from the detector assembly 6 (step B) and this response is recorded by recorder 8 (step C).

As indicated by return path D, steps A-C may be repeated to generate further pulses of seismic energy and record the responses.

One or more ambient conditions which may have an influence on the measured signal may be measured themselves prior to, during or shortly after detection of the response signals (step E). These factors may be one or more of: gravitational effects attributable to the sun and/or the moon, solar radiation levels, and variations in the Earth's magnetic field.

The signals and/or data recorded by the recorder are subsequently processed (step F) for example to reduce components attributable to noise and/or to make adjustments having regard to ambient conditions at the time recording took place. The results are then interpreted to provide information regarding the location and/or dimensions (such as thickness) of underground structures of interest, and may also provide information regarding the constitution of such formations (step G).

The seismic energy source may take a variety of forms, for example an explosive charge, firing a projectile into the ground, a plasma sound source, such as an offshore spark gun, a thumper truck, a seismic vibrator or an infrasonic cannon. It may also be possible to achieve the desired secondary response using a magnetic field source.

Preferably, an initial seismic impulse is then repeated one or more times at the same location. For example, an interval of a few minutes may elapse between shots. This is because the electromagnetic signal is believed to be caused by ionic bonds at the fluid interface being broken or stretched. With some fluids, once the seismic shock wave has moved the fluid it has broken the bonds and they take some time to re-establish. Often therefore, such fluids may not respond to a repeat impulse unless a considerable interval (of the order of several hours or days) is allowed between shots. More viscous fluids are believed to be less affected and a repeat shot soon after the first generates a repeat signal, albeit weaker than the first response.

The detector assembly is arranged to detect one or more magnetic and/or electric components of the electromagnetic signal returning to the surface. It may comprise coils, electrodes, magnetometers, geophones, and the like, depending on the nature of the field to be detected. For example, field coil antennas with high magnetic permeability cores may be provided which are suitable for detection of signals in the extra-low frequency band. They may be arranged to pick up magnetic fields in one direction, or two or three mutually orthogonal directions (for example East-West, North-South and vertical directions). If a single coil is employed, it is preferably orientated in an approximately East-West direction to reduce the magnitude of telluric signals. In a preferred implementation, the detector assembly comprises orthogonal 3-axis induction coil magnetometer receivers, multi-axis short dipole electric field receivers, and geophones.

Low noise magnetic and electric field sensors have been described by Prance et al in a number of publications, such as: "Ultra low noise induction magnetometer for variable temperature operation", Sensors and Actuators 85 (2000) 361-364; "Vector measurements with combined magnetic and electric field sensors", Review of Scientific Instruments, Vol. 74, No. 3, March 2003; and "Compact room-temperature induction magnetometer with superconducting quantum interference device level field sensitivity", Review of Scientific Instruments, Vol. 74, No. 8, August 2003.

Signals generated by the sensor(s) of the detector assembly are then stored in the recorder. This is preferably configured for high speed data acquisition for full time series recording and spectrogram display.

An amplifier or pre-amplifier may be provided to enhance the signals from the detector assembly. For example, a pre-amplifier may be installed close to the detector assembly to reduce signal noise and combined with a further amplifier. A preferred amplifier implementation is described below.

The recorder may be a dedicated digital recorder, or a general-purpose computer including a suitable sound card.

Noise present in the detected signals may be reduced by recording in parallel the ambient noise from other sources and then deducting this from the detected signals.

Another technique which may be employed is to use two identical antennas close together and in the same orientation and then record the signals generated by each separately. The outputs from the two antennas will differ in that some noise will have random phase, amplitude and frequency for each antenna. By extracting the in-phase components from the two output signals, these noise components can be reduced. A similar technique is described in "System noise cancellation by digital signal processing for SQUID measurement", Sakuta et al, Supercond. Sci. Technol. 19 (2006) S407-S410.

Further suitable techniques for suppressing noise in observed seismoelectric signals are described in "The coupled seismoelectric wave propogation in porous media: theoretical background", Gharibi et al, CREWES Research Report—Volume 16 (2004).

Environmental noise may be suppressed by using magnetic shielding around the detector assembly.

The signal strength may also be adjusted having regard to other environmental conditions, such as tidal effects, solar activity, and other external influences.

The Earth undergoes deformations in response to gravitational effects attributable to the relative positions of the Earth, sun and moon. These effects may influence the ability of the target formations to respond to the imposed signal source and/or may attenuate the signal source at some points in the tidal cycle and not at others. Modelling of these effects may be employed to adjust detected signals accordingly.

The data is processed to correlate it with the timing of the associated impulse(s) and also therefore with depth below the surface on the basis of the estimated speed of the secondary form of seismic energy.

The recorded data may be processed using commercially available software such as Labview, Sigview, Audacity, Spectrumlab or Mathlab. This processing may involve a Fourier transform of the data. The data may be outputted in a visual graphical form or in numerical form. For example, a waterfall display from Spectrumlab shows the frequency spectrum of the signals over time, with amplitude colour-coded. Distinct lines in such a display may represent signals from underground fluid bodies.

The amplitude and/or frequency distribution of the signals may be used to determine the presence and type of fluids. One factor affecting the amplitude of signals is believed to be the resistivity of the fluid. A fluid of low resistivity, such as water, conducts an electric field more easily and tends to produce a strong signal over a wide frequency band including very low frequencies. Oil tends to produce a less strong signal over a wide frequency band. Gas, having much lower viscosity, produces higher amplitude signals and seems to have less wide frequency range. So it is possible to determine the presence of fluids. The reservoir content may be predicted by comparing the shot "signatures".

A preferred amplifier configuration for adjusting the signals from the detector assembly will now be described with reference to FIGS. 3 to 5.

The amplifier is designed and constructed to measure the current flowing through a magnetometer coil, and to increase signal strength at lower frequencies (such as 1 to 30 Hz and more preferably 1 to 20 Hz), effectively producing an almost flat voltage versus frequency output over the frequency range of interest.

The amplifier 18 consists of two main stages:
(i) a low impedance current to voltage conversion stage 20 allows measurement of the current response of the coil, providing high rejection of the coil voltage signal; and
(ii) a low-pass active filtered voltage amplifier stage 22 takes the output of the current-to-voltage converter and provides increased low-frequency amplification with gain and phase response curves designed to be close to the inverse of those of the current in the coil.

The amplifier circuitry is preferably built using precision, low noise components on a PCB designed for stable operation and high noise immunity. Stability and noise immunity may be further enhanced by tight power regulation and filtering. The whole device ideally will be housed in a shielded enclosure with high quality connectors to limit pick-up of environmental noise and signal losses.

The amplifier output is coupled to an analogue data acquisition system 24. The apparatus is also arranged to integrate the detected signal and this function is represented by integrator 26 in FIG. 3.

It is recognised that the coil cannot respond to static fields and so the lower the frequency, the exponentially greater the amplification required to produce the same response, with infinite amplification required at DC.

The response curve of the amplifier will not be completely flat and it is preferable to perform compensation, ideally in software data processing, with reference to a response curve for the amplifier.

Figure 4:
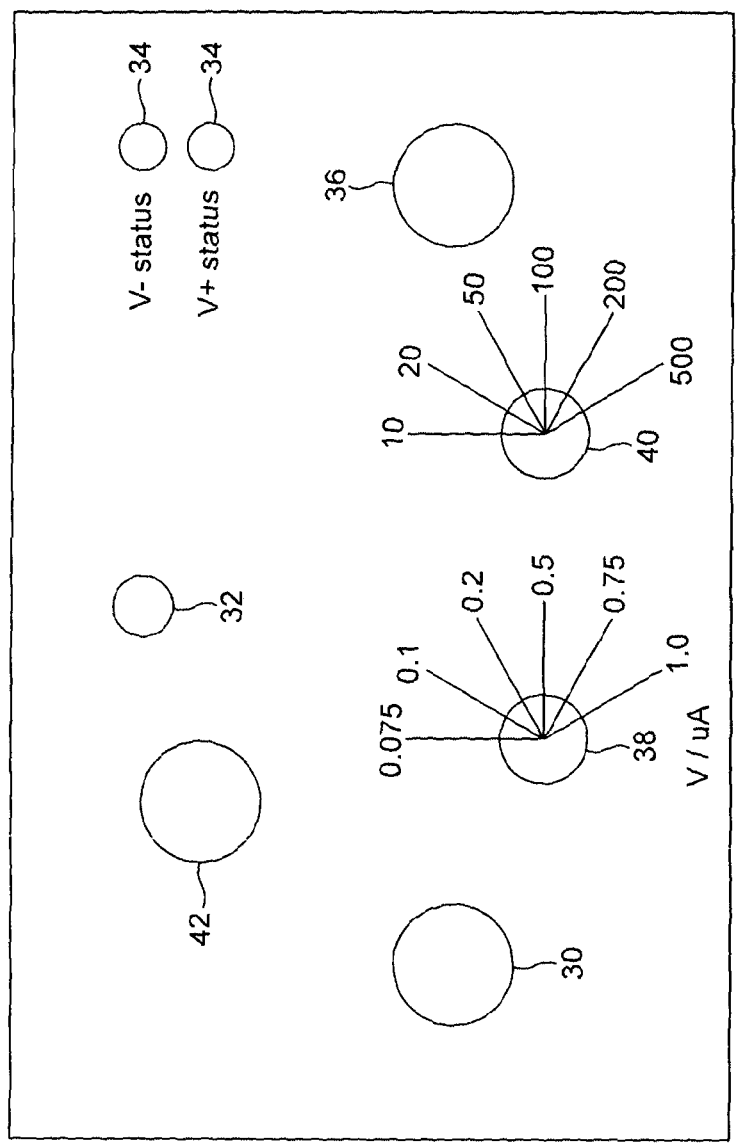
FIG. 4 is a representation of a control panel for the amplifier of FIG. 3.

An example of a suitable control panel for the amplifier is shown in FIG. 4.

The control panel features are as follows:
- 30—input—the plug socket from the antenna;
- 32—power—the on and off switch;
- 34—V lights—battery strength lights;
- 36—output—the output plug socket;
- 38—current gain control knob. This knob is used to set the amount of gain in the current amplifier 20;
- 40—post gain control knob. This sets the gain in the low pass active filtered voltage amplifier 22; and
- 42—first stage output—an intermediate output corresponding to the output from the first amplifier stage 20.

Figure 5:
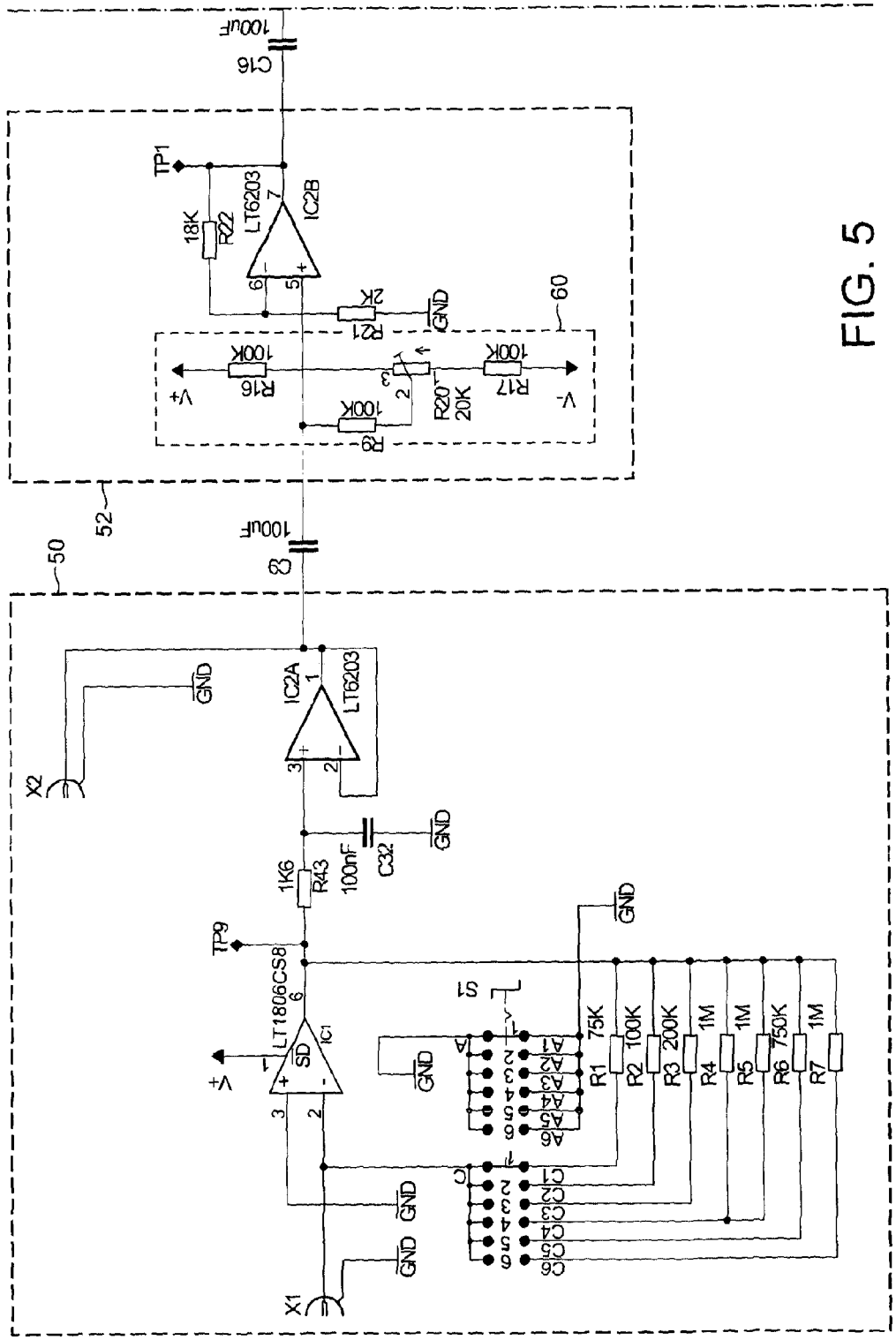
FIG. 5 is a circuit diagram corresponding to an implementation of the amplifiers of FIG. 3.
Figure 5:
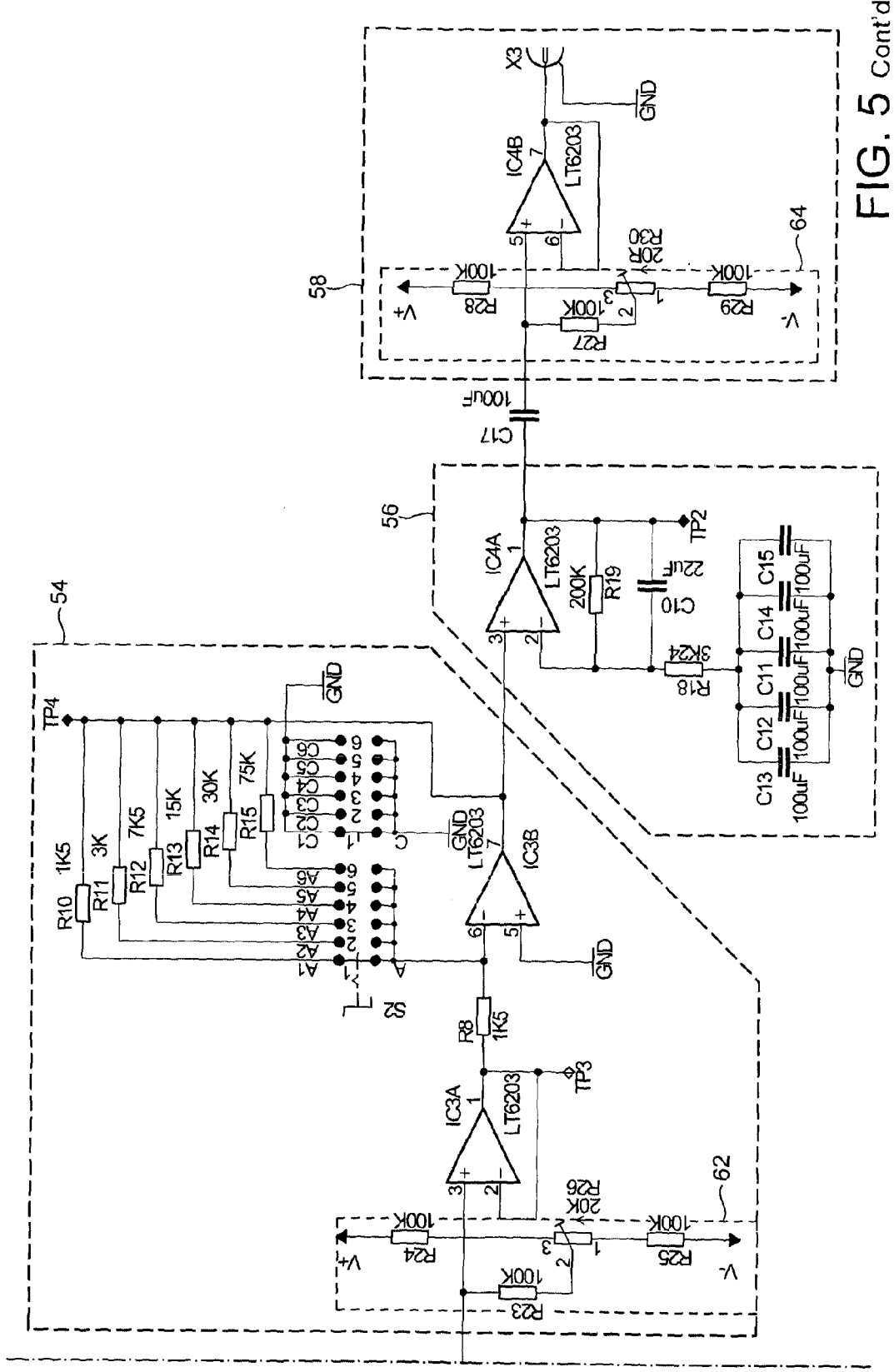

A circuit diagram corresponding to a preferred amplifier implementation is shown in FIG. 5. Separate stages 50, 52, 54, 56 and 58 are identified in the Figure.

Stage 50 is a variable high gain, ultra-low input impedance, transimpedance amplifier and noise filter. This provides a very low (effectively zero at the frequencies to be detected) impedance to the magnetometer coil connected to X1, allowing current to flow freely through the coil whilst it is measured. A very high GBP (gain bandwidth product) precision amplifier (IC1) is used to ensure gain can be maintained at the requisite frequencies. As a transimpedance amplifier converts current into voltage (V/I=R|Z=resistance|impedance). The variable gain provides first stage gains of 0.075-1 volts per microamp. R43 and C32 provide low pass noise filtering with a 3 dB point of 995 Hz. IC2A buffers the resulting signal, preventing the AC coupling capacitor, C9, from loading the filter network. X2 provides a non-compensated voltage output of the current signal to output 42 in FIG. 4.

Stage 52 is a 10× intermediate gain stage. IC2B amplifies the voltage signal from the previous stage by a factor of 10. Input offset current and voltage, which are magnified by the amplifier gain, can cause the output to saturate. Therefore an AC coupling capacitor (C9) and offset nulling network 60 allow isolation from DC offset created in stage 1 (which is un-nullable) and compensation for this stage's input offsets.

The combination of capacitor and resistor in this way creates a high-pass filter and the use of these values gives a 3 dB point of 0.029 Hz for this filter.

The same setup is used in relation to stages 54 and 58, for the same reasons. Stage 54 has an AC coupling capacitor C16 between it and stage 52 and an offset nulling circuit 62, and stage 58 has a corresponding capacitor C17 and circuit 64.

Stage 54 is a 1×–50× variable gain stage. This is a buffered inverting amplifier with multiple gain settings. AC coupling and offset nulling are employed here due to the potentially high gains. IC3A is used as a buffer to increase the lower-than-otherwise input impedance of the inverting amplifier made around IC3B. All other stages use a non-inverting design which, due to connection directly and solely to the amplifiers' input, have near infinite input impedance. This ensures that two connected stages have minimal loading on each other which would otherwise distort the signal and produce unpredictable behaviour.

Stage 56 is a frequency response compensation network. This stage boosts the signal from the coil at low frequencies, thus equalising the response tail-off down to the high millihertz and increasing the effective dynamic range of the coil.

With capacitors C11 to 15 shorted to ground, a non-inverting amplifier is created by IC4A, R19 and R18 with a DC gain of 61.73. G=1+Rf/Rg, wherein Rf=R19 in parallel with C10, and Rg is R18.

At DC, C10 has no effect on the amp as its impedance is infinite. However, as the frequency increases, the impedance of C10 goes down and so, therefore, does the effective value of Rf, decreasing the gain of the amp. Due to the very high gain of the amp at DC, any offsets could easily cause the amp to saturate. Therefore a very large (500 uF) capacitor, in this case made up of 5×100 uF capacitors (C11 to 15) drops the gain to 1 at DC. This is because Rg in the above equation is in practice R18+Z(C11 to 15) which at DC is infinite.

Stage 58 is an output buffer. It buffers the output of the amplifier to avoid any loading on the amplifier from circuitry connected to the output.

Figure 3:
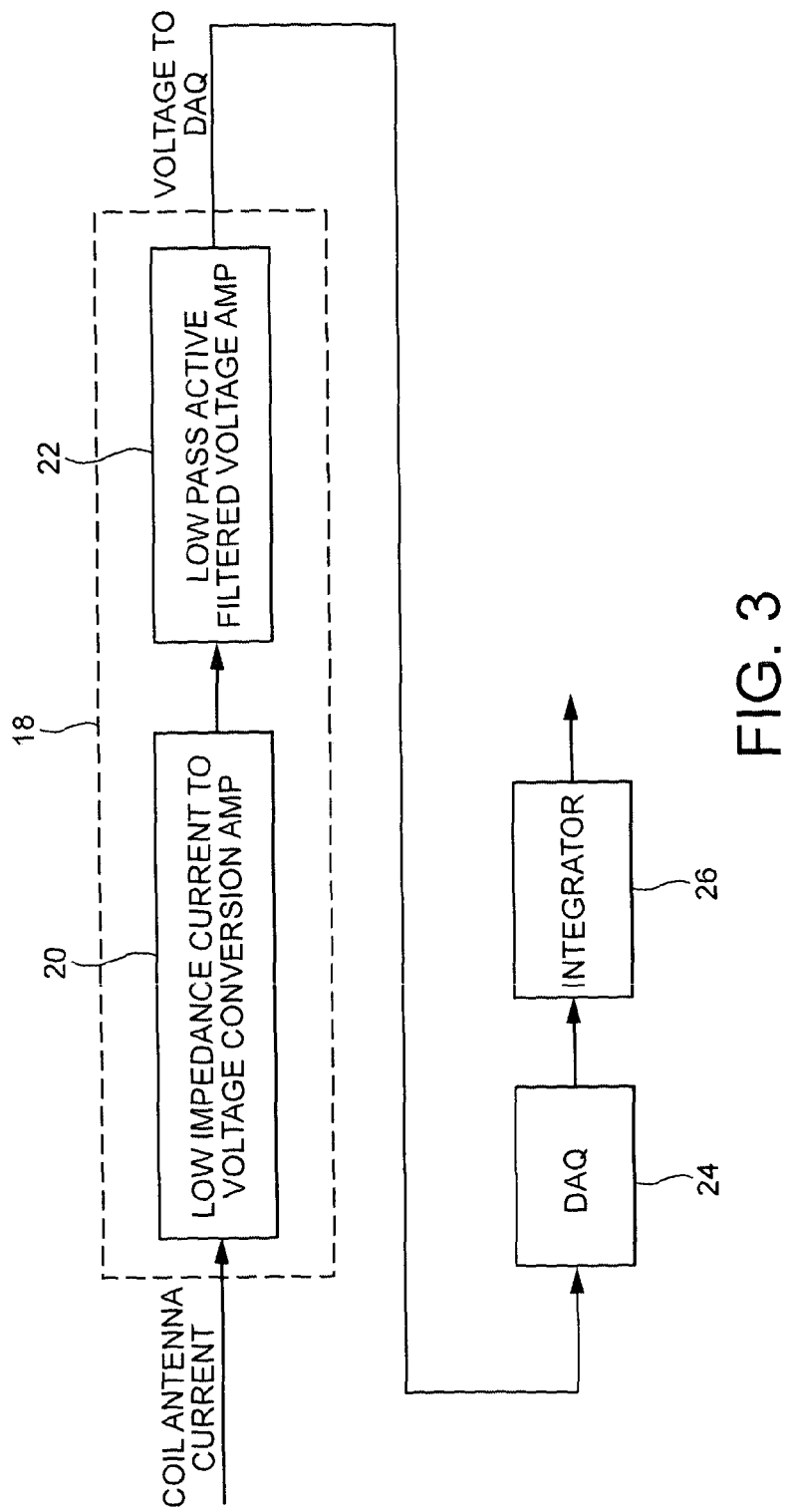
FIG. 3 is a block diagram of an arrangement for processing detected signals.

In the embodiment of FIG. 3, the amplifier output is coupled to a data acquisition system 24. This preferably provides high sample rate capture of the signal down to DC. This allows accurate evaluation of the received signal and makes possible the acquisition of low frequency signals. The device may be configured with a USB connection for ease of use in the field with a laptop for example.

A magnetometer coil responds to the derivative with respect to time of the magnetic field strength. In order to quantify the actual field strength, integration with respect to time of the measured signal is performed by integrator 26.

The preferred way to perform this operation is in software on gathered data rather than electronically. Electronic integrators tend to be inherently unstable and outputs may drift due to imperfections in the components. More complex and accurate operations may be carried out in software on gathered data.

In conventional seismic mapping techniques, the return times of different acoustic reflections are measured and comparing the return times to an array of geophones provides a time map of the velocity interfaces. In areas where there is a control well, the time is compared to the known depth of the horizons and this enables geophysicists to interpret the time map into a depth map of where the data is produced. It will be appreciated that conventional seismic techniques map structures based on reflections which occur from rocks of changing densities. Seismic mapping picks up some of these layers which are moreover not the reservoir rock but might for example be a hard layer which normally lies an estimated distance above or below the reservoir. This provides a general view of geological structure but generally cannot determine whether the reservoir rock itself is present.

According to the methods described herein, a slow wave produces a signal directly beneath the shot from the seismic energy source, from the fluids in the reservoir. The operator may then move a distance away and fire another shot. Comparing the times of the different shots gives a time map. The shots can be correlated to control wells which have known reservoirs at known depths to calculate the velocity. This then facilitates interpretation of the time map into a depth map. One of the advantages of the present technology is that it responds to signals from the fluids within the reservoir. Unlike conventional seismic techniques, the structure of the fluid interface and thickness of the porous or permeable formation can in many cases be determined, which provides a structural and isopachous map of the reservoir directly.

Figure 6:
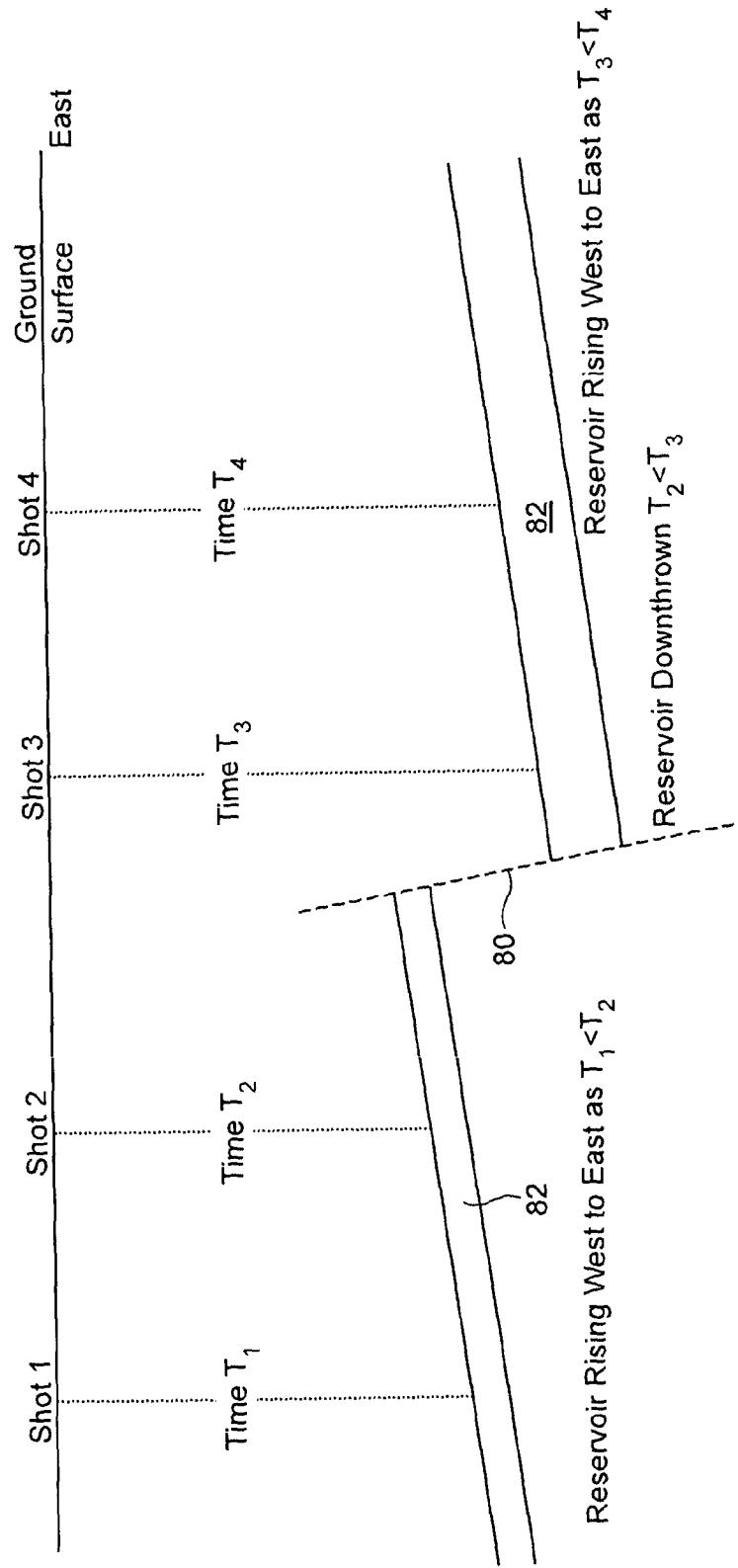
FIG. 6 is a diagram representing a cross-section through the Earth's surface including a geological fault and an oil reservoir.

For example, in the illustration of FIG. 6, an existing control well is at shot 1 and the proposed well location is at shot 2. A geological fault 80 seals the reservoir 82 so that the oil is trapped against the fault.

A shot is executed at the control well. As the depths of the formations in the control well are known it is possible to calculate the velocity of the signal. The time down to each formation can then be measured with subsequent shots at different locations, which multiplied by the velocity determined at the control well gives the depth of the formation at each location. The signal duration multiplied by its velocity may give the general thickness of the porous or permeable formation.

Accordingly, in the scenario shown in FIG. 6, shots 1 to 4 are carried out at respective locations that are spaced apart in a West-East direction. Each shot yields a respective return time $T_1$ to $T_4$, from which an associated distance to the reservoir can be calculated. From these results the reservoir depth can be seen to reduce between short location 1 and shot location 2, and also between shot locations 3 and 4, with the discontinuity caused by the fault inferred between shot locations 2 and 3.

Multiple shots may be carried out at each shot location during a mapping operation. This gives a distribution of data for the velocity and a distribution of data for the time down to the porous/permeable reservoir interface and its thickness at each point. Statistically these data samples may reduce risk in several ways. For example:
- if the reservoir depth is less in all circumstances at the new location relative to the control well, this indicates that the reservoir is higher;
- if the reservoir depth in some circumstances of control velocities multiplied by the times of the shots is less than at the control well but sometimes it is more, then statistical methods can be used to provide a probabilistic outcome. One such method would be to assume that the scattering of depth estimates is "normally" distributed and by calculating the standard deviation, confidence limits can be calculated relating to the probabilities;
- if the reservoir thickness is measured, statistical methods can be used to calculate the probability of a given reservoir thickness.

The invention claimed is:

1. A method of geophysical prospecting for detecting bodies of fluids in underground formations, comprising the steps of:
    activating a seismic energy source to transmit seismic energy into the ground, the seismic energy from the activation comprising seismic waves which travel at the speed of sound as attenuated by the materials through which they pass and a slow energy impulse propagating from the energy source to the formations more slowly than the seismic waves;

detecting an electromagnetic signal generated by interaction between the slow energy impulse from the activation of the energy source and underground formations including fluids, wherein the detected electromagnetic signal comprises frequencies in the range 0 to 30 Hz;

recording data representing a parameter derived from the detected electromagnetic signal against time; and processing the recorded data by correlating it with the depth of fluid-containing underground formations with which the slow energy impulse interacted to generate the electromagnetic signal on the basis that the slow energy impulse travelled from the energy source to the underground formations at an average speed in the range 5 to 30 m/s.

2. A method of claim 1, including a step of converting the detected electromagnetic signal via a current-to-voltage converter.

3. A method of claim 2, including a step of amplifying lower frequencies of the signal output from the current-to-voltage conversion step relative to higher frequencies of the signal output.

4. A method of claim 1, wherein the detecting step detects the rate of change of the electromagnetic signal, and the method includes a step of integrating the detected signal with respect to time.

5. A method of claim 1, wherein harmonics of the electromagnetic signal generated by interaction between the slow energy impulse and underground formations including fluids are recorded.

6. A method of claim 1, wherein a magnetic component of the electromagnetic signal is detected.

7. A method of claim 6, wherein a magnetic component of the electromagnetic signal is detected in two or three mutually orthogonal directions.

8. A method of claim 1, wherein an electric component of the electromagnetic signal is detected.

9. A method of claim 8, wherein an electric component of the electromagnetic signal is detected in two or three mutually orthogonal directions.

10. A method of claim 1, wherein the slow energy impulse propagates along at least part of its path to the underground formations as a poroelastic compressional slow wave.

11. A method of claim 1, including the steps of:
activating the seismic energy source at least twice, with a predetermined time interval between the activations; and
comparing the electromagnetic signal responses detected after each activation.

12. A method of claim 11, including the step of determining information relating to the properties of a body of fluid detected underground on the basis of the comparison.

13. A method of claim 1, wherein statistical analysis is used to process measurements derived from a plurality of seismic energy source activations carried out at the same location.

14. A method of claim 1, including a step of:
activating the seismic energy source at at least two different locations, wherein the detecting and recording steps are carried out after each activation.

15. A method of claim 1, wherein electromagnetic signals are detected using at least two antennas, and the method includes the steps of:
comparing the signals generated by the antennas so as to identify signal content attributable to noise.

16. A method of claim 1, including the steps of:
detecting ambient noise present at the detection location; and
processing signals generated in the step of detecting electromagnetic signals to reduce the amount of signal content attributable to the ambient noise.

17. A method of claim 1, including the step of adjusting the recorded data having regard to the effects of gravity attributable to the moon.

18. A method of claim 1, including the step of adjusting the recorded data having regard to the effects of gravity attributable to the sun.

19. A method of claim 1, including the step of adjusting the recorded data having regard to solar radiation levels.

20. A method of claim 1, including the step of determining information relating to the properties of a body of fluid detected underground with reference to the frequency and/or amplitude of detected electromagnetic signals generated by interaction between the slow energy impulse and the underground formation of which the body of fluid forms part.

21. A method of claim 1, including a step of determining information relating to the properties of a fluid-containing formation detected underground with reference to the frequency and/or amplitude of a detected electromagnetic signal generation by interaction between the slow energy impulse and the underground formation of which the body of fluid forms part.

22. A method of claim 21, wherein the detected electromagnetic signal is correlated with porosity or permeability of the underground formation.

23. Apparatus for geophysical prospecting to detect bodies of fluids in underground formations, comprising:
a detector assembly for detecting an electromagnetic signal generated by interaction between a slow energy impulse from the activation of a user-activated seismic energy source and underground formations including fluids, the slow energy impulse propagating to the formations more slowly than seismic waves from the same activation of the energy source travelling at the speed of sound as attenuated by the materials through which they pass, wherein the detected electromagnetic signal comprises frequencies in the range 0 to 30 Hz;
a recorder arranged to record data representing a parameter derived from the detected electromagnetic signal against time; and
a processing arrangement configured to process the recorded data by correlating it with the depth of fluid-containing underground formations with which the slow energy impulse interacted to generate the electromagnetic signal on the basis that the slow energy impulse travelled from the energy source to the underground formations at an average speed in the range 5 to 30 m/s.

24. Apparatus of claim 23, wherein the detector assembly comprises a coil antenna having a core of high magnetic permeability material.

25. Apparatus of claim 23 wherein the recorder is arranged to record harmonics of the electromagnetic signal generated by interaction between the slow energy impulse and underground formations including fluids.

26. Apparatus of claim 23, wherein the detector assembly comprises an antenna, and magnetic shielding associated with the antenna to reduce the magnitude of signals incident on the antenna which emanate from a source above the ground.

27. Apparatus of claim 23, wherein the detector assembly comprises at least two antennas, and the apparatus includes a processor configured to compare the signals generated by the antennas so as to identify signal content attributable to noise.

28. Apparatus of claim 23, wherein the detector assembly is operable to detect a magnetic component of the electromagnetic signal in three mutually orthogonal directions.

29. Apparatus of claim 23, wherein the detector assembly is operable to detect an electric component of the electromagnetic signal in three mutually orthogonal directions.

30. Apparatus of claim 23, wherein the detector assembly includes at least one geophone.

31. Apparatus of claim 23, including a current-to-voltage converter electrically coupled to the detector assembly.

32. Apparatus of claim 31, including an amplifier electrically coupled to the current-to-voltage converter and arranged to amplify lower frequencies of the output from the current-to-voltage converter relative to higher frequencies of the output.

33. Apparatus of claim 23, including an integrator for integrating the detected electromagnetic signals.

* * * * *